United States Patent
Michimura et al.

(10) Patent No.: US 10,503,540 B2
(45) Date of Patent: Dec. 10, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Tadao Michimura, Kanagawa (JP); Masao Morita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 87 days.

(21) Appl. No.: 15/806,881

(22) Filed: Nov. 8, 2017

(65) Prior Publication Data

US 2018/0232253 A1    Aug. 16, 2018

(30) Foreign Application Priority Data

Feb. 10, 2017 (JP) ................. 2017-023637

(51) Int. Cl.
*G06F 9/455* (2018.01)
*G06F 9/46* (2006.01)
*G06F 9/48* (2006.01)

(52) U.S. Cl.
CPC .......... *G06F 9/485* (2013.01); *G06F 9/45558* (2013.01); *G06F 9/4881* (2013.01); *G06F 2009/45575* (2013.01); *G06F 2009/45583* (2013.01)

(58) Field of Classification Search
CPC . G06F 2009/45575; G06F 2009/45583; G06F 9/485; G06F 9/4881; G06F 9/45558; G06F 9/5055; G06F 9/5027; G06F 9/505; G06F 9/5044; G06F 9/5005; G06F 9/5033; G06F 9/5077; H04L 67/1004; H04L 67/1006; H04L 67/1008; H04L 67/1012; H04L 67/1014; H04L 67/1023
See application file for complete search history.

(56) References Cited

U.S. PATENT DOCUMENTS

| | | | |
|---|---|---|---|
| 6,504,621 B1 * | 1/2003 | Salgado | H04N 1/00915 358/1.1 |
| 7,653,794 B2 | 1/2010 | Michael et al. | |
| 8,359,594 B1 * | 1/2013 | Davidson | G06F 9/5077 709/218 |

(Continued)

FOREIGN PATENT DOCUMENTS

| | | |
|---|---|---|
| JP | 2009-536762 A | 10/2009 |
| JP | 2013-179456 A | 9/2013 |
| JP | 2014-532354 A | 12/2014 |

*Primary Examiner* — Emerson C Puente
*Assistant Examiner* — Zhi Chen
(74) *Attorney, Agent, or Firm* — Oliff PLC (57) ABSTRACT

An information processing apparatus includes a controller that controls activation of a processing unit that processes data, and a memory that stores information related to the condition of a processing unit. The controller causes a processing unit to transition in advance from a stopped state to a ready state that is an intermediate state between the stopped state and an active state, and stores information related to the condition of the processing unit in the ready state into the memory. In response to receipt of a process request from a user, the controller causes the processing unit in the ready state to transition from the ready state to the active state by use of settings information specific to the user and the information related to the condition of the processing unit in the ready state.

12 Claims, 4 Drawing Sheets

(56) References Cited

U.S. PATENT DOCUMENTS

| | | | | |
|---|---|---|---|---|
| 8,417,817 B1* | 4/2013 | Jacobs | .................... | H04L 69/28 |
| | | | | 340/1.1 |
| 8,601,583 B1* | 12/2013 | Chandrasekhar | ....... | G06F 21/54 |
| | | | | 726/24 |
| 9,432,306 B2 | 8/2016 | Khasnabish | | |
| 10,228,864 B1* | 3/2019 | Zelenov | ................ | G06F 3/0611 |
| 2010/0229218 A1* | 9/2010 | Kumbalimutt | ........ | G06F 9/5005 |
| | | | | 726/4 |
| 2011/0271278 A1* | 11/2011 | Dittrich | .................... | G06F 8/60 |
| | | | | 718/1 |
| 2013/0275975 A1* | 10/2013 | Masuda | ................ | G06F 9/5077 |
| | | | | 718/1 |
| 2015/0150014 A1* | 5/2015 | Sar | ........................... | G06F 9/46 |
| | | | | 718/102 |
| 2016/0100036 A1* | 4/2016 | Lo | .......................... | H04L 67/42 |
| | | | | 709/203 |
| 2016/0266935 A1* | 9/2016 | Iwata | .................... | G06F 9/5038 |

* cited by examiner

FIG. 2

| VM IDENTIFIER | STATE | MAXIMUM USER COUNT | LOGGED-IN USER COUNT | LOGGED-IN USERS | MAXIMUM JOB COUNT | CURRENTLY EXECUTED JOBS |
|---|---|---|---|---|---|---|
| VM1 | ACTIVE | 2 | 1 | UserA | 1 | Job1 |
| VM2 | STOPPED | 2 | 1 | UserB | 1 | Job2 |
| VM3 | READY | 2 | 0 | — | 1 | — |
| ... | ... | ... | ... | ... | ... | ... |

FIG. 3

FIG. 4

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-023637 filed Feb. 10, 2017.

BACKGROUND

Technical Field

The present invention relates to an information processing apparatus and a non-transitory computer readable medium.

SUMMARY

According to an exemplary embodiment of the present invention, there is provided an information processing apparatus including a controller that controls activation of a processing unit that processes data, and a memory that stores information related to a condition of the processing unit. The controller causes a processing unit to transition in advance from a stopped state to a ready state that is an intermediate state between the stopped state and an active state, and stores information related to the condition of the processing unit in the ready state into the memory. In response to receipt of a process request from a user, the controller causes the processing unit in the ready state to transition from the ready state to the active state by use of settings information specific to the user and the information related to the condition of the processing unit in the ready state.

BRIEF DESCRIPTION OF THE DRAWINGS

Exemplary embodiment of the present invention will be described in detail based on the following figures, wherein.

DETAILED DESCRIPTION

Figure 1:
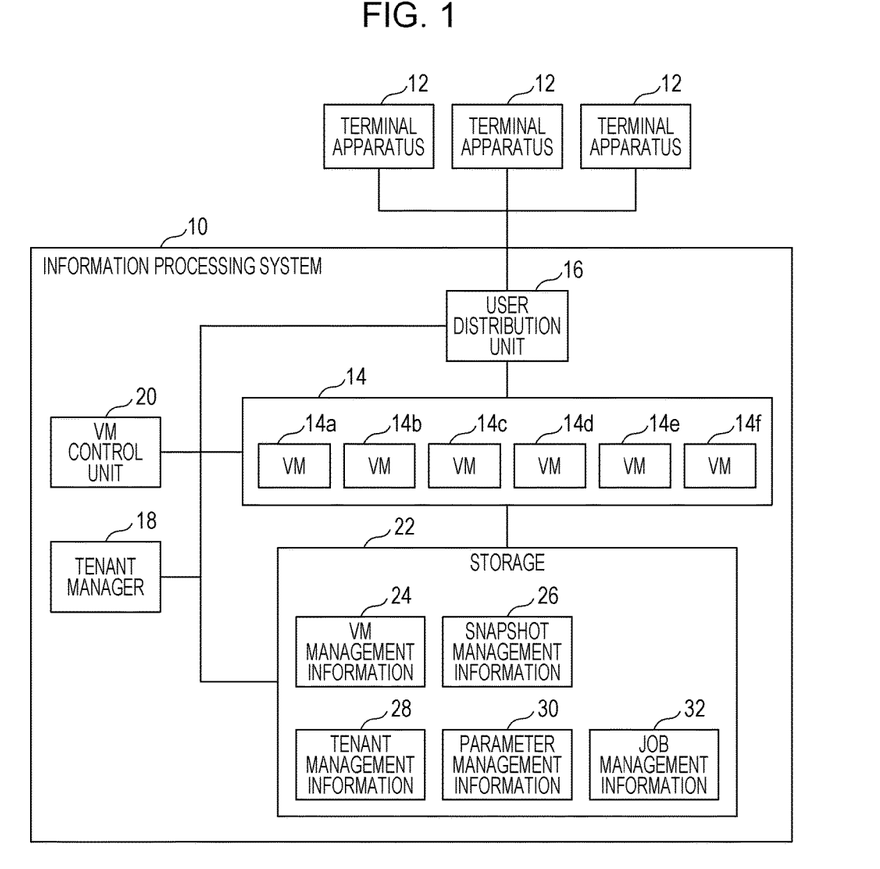
FIG. 1 illustrates an exemplary information processing system according to the exemplary embodiment.

With reference to FIG. 1, an information processing system according to an exemplary embodiment of the present invention will be described. FIG. 1 illustrates an exemplary information processing system according to the exemplary embodiment.

An information processing system 10 according to the exemplary embodiment provides a user with the service of executing processes. In one example, the information processing system 10 employs a multi-tenant system in which multiple users (tenants) share resources. Examples of the above-mentioned processes include image processing (image processing job), a process related to printing (print job), and a process related to scanning (scan job). The information processing system 10 may include the function of executing at least one of these processes. Of course, the information processing system 10 may execute processes other than those mentioned above.

Examples of image processing jobs include a drawing difference computing process that involves computing the difference between multiple drawings (images), and a character recognition process such as an optical character recognition (OCR) process. For example, the information processing system 10 receives image data from a terminal apparatus 12 such as a personal computer (PC) or a mobile terminal via a communication path such as a network, applies image processing to the image data, and sends the results of image processing to the terminal apparatus 12.

A print job represents data processing performed to print, on a printer, user-specified document data to be printed. Examples of print jobs include converting document data into print data, transmitting converted print data to a printer specified by the user, converting document data into an image and then extracting information from the image, and transferring processing results to another server or other destinations. For example, the information processing system 10 receives document data from the terminal apparatus 12 via a communication path, converts the document data into print data in a format that can be handled by a printer (not illustrated), and supplies the resulting print data to the printer via the communication path to have printing executed by the printer.

A scan job is a job including data processing on an image obtained by scanning, transfer of an image, or other processes. In this case, the terminal apparatus 12 may be, for example, a scanner, a facsimile, or a multifunction machine (an apparatus that combines the functions of devices such as a printer, a scanner, a copier, and a facsimile).

The information processing system 10 includes one or more virtual machines (VMs). In the example illustrated in FIG. 1, the information processing system 10 includes a VM group 14. The VM group 14 includes six VMs (VMs 14a, 14b, 14c, 14d, 14e, and 14f). Of course, the number of VMs is for illustrative purposes only. A VM executes a process (e.g., a job such as an image processing job, a print job, or a scan job) corresponding to an instruction given from the user. A VM may be built on an infrastructure provided by, for example, an Infrastructure as a Service (IaaS) provider.

A VM executes, in addition to processing of a job assigned to the VM, a user interface process for processing a request made from the user. Examples of user interface processes include a login process that involves determining whether to permit the user to connect (log in) to the information processing system 10, a process that involves receiving settings on parameters (e.g., print attributes such as the number of copies to be printed) for a job, a process that involves receiving a request for starting execution of a job, and a process that involves, upon receipt of a request for checking the state of a print job, providing the user with information about the state of the job.

A user distribution unit 16 has the function of distributing (assigning) a process request from a user (terminal apparatus 12) to one of VMs.

A tenant manager 18 has the function of creating information (tenant management information 28) about each tenant (each user) who uses services provided by the information processing system 10, and managing each tenant. The tenant management information 28 is stored in a storage 22. The tenant management information 28 includes, for example, information that uniquely identifies each tenant, information indicating processes (e.g. an image processing job, a print job, a scan job, or other jobs) available to be used by each tenant (each user), and information indicating the degree of multiplicity for each tenant (each user).

What process is available to each tenant is determined in advance in accordance with a service contract or other agreements, for example. For example, suppose that Tenant A (User A) has entered into a service contract for services provided by the information processing system 10, and the service contract specifies a drawing difference computing process as a process available to Tenant A. In this case, Tenant A is able to use a drawing difference computing process provided by the information processing system 10.

The degree of multiplicity refers to the number of concurrently executable processes, that is, the number of processes that can be executed in parallel. The number of concurrently executable processes is set in advance for each individual tenant (each individual user) in accordance with a service contract or other agreements, for example. For example, suppose that the service contract specifies that the degree of multiplicity (the number of concurrently executable processes) for Tenant A is "3". In this case, Tenant A is able to request for three processes to be executed in parallel. For example, if, with two jobs requested by Tenant A being currently executed by a VM, a request for executing another job (third job) is made from Tenant A, the other job (the third job) is also executed by the VM. If, with three jobs requested by Tenant A being currently executed, a request for executing another job (fourth job) is made from Tenant A, the other job (the fourth job) is not executed. The fourth job is executed once the execution of at least one of the three currently executed jobs is completed.

A VM control unit 20 has the function of controlling each VM. For example, the VM control unit 20 activates a VM that is in a stopped state or stops a VM that is in an active (i.e., running) state. Further, the VM control unit 20 causes a VM to transition from the stopped state to a ready state, which is an intermediate state between the stopped state and the active state, and stores information related to the condition of the VM in the ready state. The ready state refers to a state in which a function for executing a process has been assigned to a VM but settings information specific to a user who has requested for the execution of the process has not been mounted onto the VM. Specifically, the ready state refers to a state in which a program for executing a process has been loaded into a VM but user-specific parameters have not been mounted onto the VM. For example, the VM control unit 20 creates, as information related to the condition of a VM in the ready state, a snapshot of the VM in the ready state, and stores the snapshot into the storage 22. A snapshot represents an extraction of various information (e.g., information such as information about a memory, disk images, information about a register, files, directories, database files, and source codes) constituting a VM at a given point in time. When the VM control unit 20 receives a process request from a tenant (user), the VM control unit 20 uses settings information (parameters) specific to the user, and information (snapshot) related to the condition of a VM in the ready state to cause the VM to transition from the ready state to the active state. That is, the VM control unit 20 mounts user-specific settings information (parameters) onto a VM that is in the ready state (a VM that has been loaded with a program for executing a process) to thereby activate the VM. As a result, a VM that provides a process specific to the user is built. For example, the user distribution unit 16 and the VM control unit 20 constitute a controller, an activation control unit, and a storage control unit.

For example, in executing a process that provides a screen for entering a user ID, different information is displayed on the screen for each tenant (each user) in some cases. For example, consider a case where for a process related to a given tenant, a character string "Employee ID" is displayed on the screen as a user ID, and for a process related to another tenant, a character string "Member ID" is displayed on the screen as a user ID. A VM in the ready state refers to a VM that has been loaded with a program for executing the process of displaying a screen used to enter a user ID. A character string "Employee ID" or a character string "Member ID" corresponds to a user-specific parameter (settings information). When a parameter (Employee ID) specific to Tenant A is applied to a VM that is in the ready state, the state of the VM transitions from ready to active. The activated VM executes the process of providing a screen used to enter a user ID. If the parameter specific to Tenant A is applied, a character string "Employee ID" is displayed on the screen as a character string indicative of a user ID, and an entry field for entering an employee ID is displayed on the screen. Likewise, if a parameter (Member ID) specific to Tenant B is applied to a VM that is in the ready state, the VM activates, and executes the process of providing a screen used to enter a user ID. In this case, a character string "Member ID" is displayed on the screen as a character string indicative of a user ID, and an entry field for entering a member ID is displayed on the screen. As described above, even for a process that is common between multiple tenants (e.g., the process of providing a screen used to enter a user ID), parameters specific to individual tenants (e.g., character strings such as "Employee ID" or "Member ID") may differ from each other in some cases. In such cases, a parameter specific to each user is applied to a VM that is in the ready state to thereby provide a process specific to the user.

Examples of process requests that a VM receives from a user (terminal apparatus 12) include a login request, a job execution request, and a job state check request.

Upon receipt of a login request from the terminal apparatus 12, the VM to which the login request has been assigned by the user distribution unit 16 determines, by use of user authentication information such as a password received from the terminal apparatus 12, whether to permit the user to log in. Once login is permitted, the user becomes logged in to the information processing system 10. A request from a logged-in user is received and processed by the VM that has accepted the user's login. That is, the user may be now regarded as logged in to the VM.

For example, if a print job is to be executed in the logged-in state, the logged-in user (terminal apparatus 12) enters information such as print data or print parameters into the VM. Then, the VM issues a unique job identifier, and stores the entered information into the storage 22 in association with the job identifier. When a job execution request is input to a VM from the terminal apparatus 12, the VM adds the job identifier to the end of a queue (print queue). Once each VM becomes able to accept the next print job, the VM accepts the print job at the head of the queue. When a user wants to check the state of a print job inserted into a queue, the user requests for a job state check. In response to this request, a job state check request is sent from the terminal apparatus 12 to the information processing system 10. When a VM within the information processing system 10 receives this request, the VM returns, to the terminal apparatus 12, information indicating the current state of the print job for which the request has been made.

When a user explicitly requests for a logout, or when a login times out due to user inactivity for a predetermined period of time, the user's logged-in state is cancelled. If the user wants to submit a request to the information processing system 10 after the login is cancelled, the user needs to log in again. For example, consider a case where the user logs in and submits a job, makes a job execution request, and then the login is cancelled. If, thereafter, the user wants to know the state of the job, the user makes a login request and logs in to the information processing system 10 again, and then makes a job state check request.

The user distribution unit 16, the tenant manager 18, and the VM control unit 20 may be each built on a virtual machine.

The storage 22 is a storage device shared between the VM group 14, the user distribution unit 16, the tenant manager 18, and the VM control unit 20. The storage 22 stores VM management information 24, snapshot management information 26, the tenant management information 28, parameter management information 30, and job management information 32. The VM group 14, the user distribution unit 16, the tenant manager 18, and the VM control unit 20 reference these pieces of information in executing a process.

The VM management information 24 represents information for managing individual VMs. Examples of the VM management information 24 include information indicating jobs currently executed by individual VMs. The VM management information 24 includes, for example, the following pieces of information associated with each other for each VM: a VM identifier that uniquely identifies the VM, and information indicating a job currently executed by the VM.

The snapshot management information 26 represents information for managing information (snapshot) about the condition of each VM. The snapshot management information 26 includes, for example, the following pieces of information associated with each other for each VM: a VM identifier that uniquely identifies the VM, and information (snapshot) indicating the condition of the VM. For example, the VM control unit 20 causes a VM to transition from the stopped state to the ready state, and creates a snapshot of the VM in the ready state. The created snapshot is stored into the storage 22 while being included in the snapshot management information 26.

As described above, the tenant management information 28 represents information related to each tenant (user). The tenant management information 28 includes, for example, the following pieces of information associated with each other for each tenant (each user): a user identifier that uniquely identifies the tenant (user), information indicating a process (e.g., a job such as an image processing job, a print job, or a scan job) available to the tenant, and information indicating the degree of multiplicity for the tenant.

The parameter management information 30 represents information for managing settings information (parameters) applied to a VM. The parameter management information 30 includes, for example, the following pieces of information associated with each other for each tenant (each user): a user identifier that uniquely identifies the tenant (user), and settings information (parameters) specific to the tenant. Examples of settings information on each tenant include information such as image processing parameters, processing results, logs, user information, and information used for user interfacing. Settings information on each tenant is created in advance, and stored into the storage 22 in advance.

The job management information 32 represents information for managing processes (jobs). The job management information 32 includes, for example, the following pieces of information associated with each other for each job: a job identifier that uniquely identifies the job (e.g., an image processing job, a print job, a scan job, or other jobs), a user identifier that uniquely identifies a tenant (user) who has submitted the job, information indicating the location where data used for the job is stored, information indicating the current status of the job, and information indicating the load of the job (e.g., the time required for a VM to complete the execution of the job).

Figure 2:
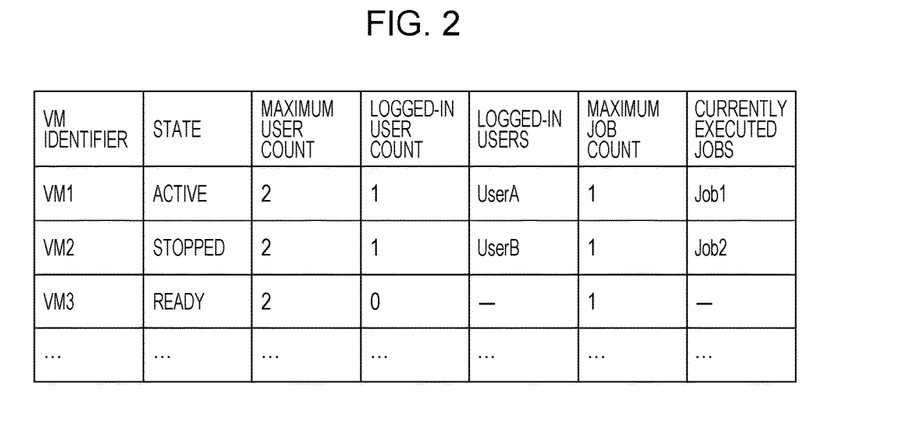
FIG. 2 illustrates an exemplary VM management table.

Referring to FIG. 2, the VM management information 24 will be described in detail below. FIG. 2 illustrates a VM management table, which is an example of the VM management information 24.

The VM management table includes, for example, the following pieces of information associated with each other for each VM: a VM identifier that uniquely identifies the VM, the state (Active, Stopped, or Ready) of the VM, the number of users that can be simultaneously accepted by the VM, the number of users currently logged in to the VM (Logged-in User Count), a list of the user identifiers of currently logged-in users (Logged-in Users), the maximum number of jobs that can be executed in parallel by the VM, and a list of the job identifiers of jobs currently executed by the VM (Currently Executed Jobs).

The maximum number of jobs and the maximum number of users are determined in advance in accordance with the throughput of each VM. Examples of VM states include active, stopped, and ready. The active state refers to when a VM has already been activated, that is, the VM is able to execute a job or user interface process. The stopped state refers to when a VM is currently stopped. For a stopped VM to become able to execute a user interface process, an activation process for activating the VM is required, and this activation process takes some time. The ready state refers to an intermediate state between the active state and the stopped state, that is, a preparatory stage prior to activating or stopping a VM. More specifically, as described above, the ready state refers to a state in which a program for executing a process has been loaded into a VM but a user-specific parameter has not been mounted onto the VM. Although a VM has not been stopped yet in the ready state, the VM in this state neither accepts a new job nor executes a user interface process. For the VM to execute such a process, the VM needs to return to the active state. It is to be noted, however, that since a VM in the ready state has not been stopped yet, the time required to activate the VM is reduced in comparison to when the VM is returned from the stopped state to the active state.

The VM management table (VM management information 24) is updated by the user distribution unit 16, the VM control unit 20, and each VM as needed. For example, when the VM control unit 20 causes a VM to transition to another state, the state of the VM within the VM management table is updated to a value that reflects the transition. When the user distribution unit 16 distributes a login request from a user to one of VMs, 1 is added to the logged-in user count for the VM within the VM management table. When a VM executes a login process and authenticates a user, the user identifier of the user is added to the VM management table as an indication of the logged-in user. When a user currently logged in to a VM logs out, 1 is subtracted from the logged-in user count for the VM, and the user identifier of the user is removed from the VM management table. When a VM takes a new job from a queue and starts executing the job, the job identifier of the job is added to the Currently Executed Jobs field. When the VM completes the execution of the job, the job identifier of the job is removed from the Currently Executed Jobs field.

The information processing system 10 will be described below in more detail.

Figure 3:
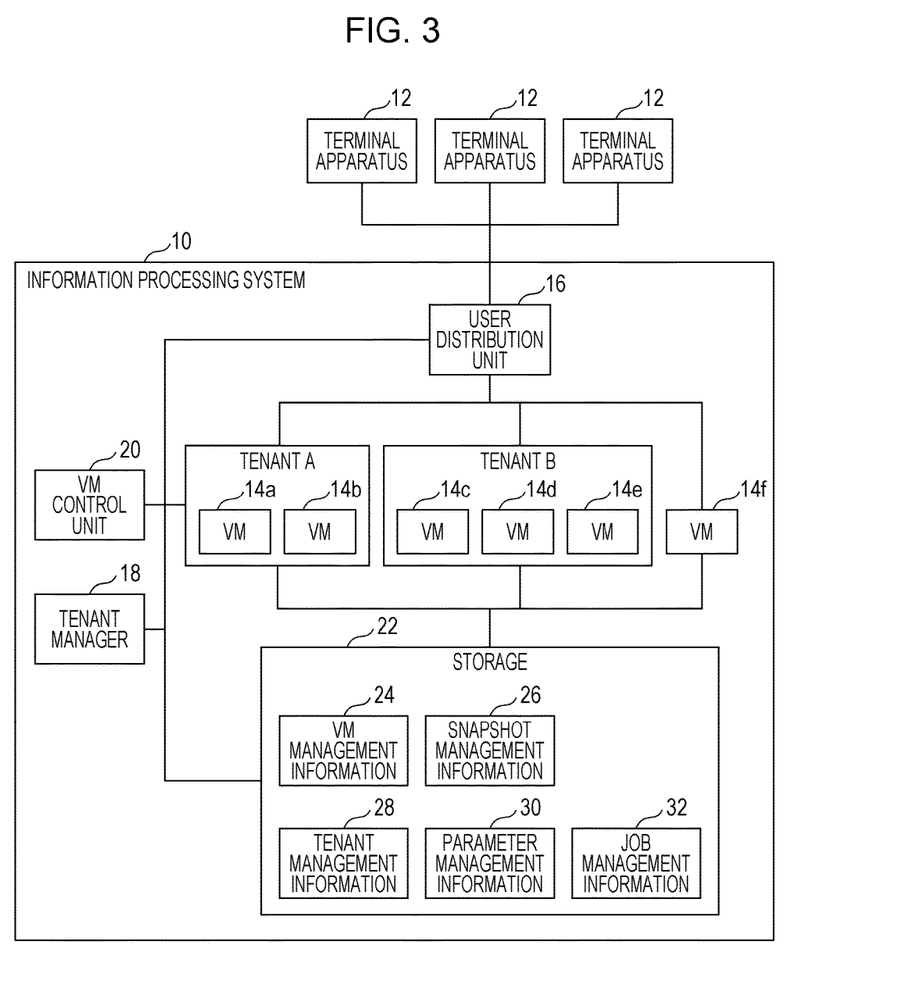
FIG. 3 illustrates an exemplary information processing system according to the exemplary embodiment.

Referring to FIG. 3, a description will be given of the information processing system 10 with tenants (users) distributed to individual VMs. FIG. 3 illustrates an example of the information processing system 10. In the example illustrated in FIG. 3, Tenant A (User A) has already been distributed to the VMs 14a and 14b, and Tenant B (User B) has already been distributed to the VMs 14c, 14d, and 14e. The VM 14f is assigned to none of the tenants.

The VM control unit 20 causes the VMs 14a and 14b to transition from the stopped state to the ready state. That is, the VM control unit 20 loads a program for executing a process available to Tenant A into the VMs 14a and 14b, thus causing the VMs 14a and 14b to transition to the ready state. As a result, a function for executing the process available to Tenant A is assigned to the VMs 14a and 14b. Further, the VM control unit 20 creates respective snapshots of the VMs 14a and 14b that are in the ready state. The respective snapshots of the VMs 14a and 14b are stored into the storage 22 while being included in the snapshot management information 26.

The VMs 14a and 14b may execute different processes or may execute the same process. If the VMs 14a and 14b are to execute different processes, the VM control unit 20 loads different programs into the VMs 14a and 14b. For example, if Tenant A is able to use a drawing difference computing process and a character recognition process, then, for example, the VM control unit 20 loads a program for executing the drawing difference computing process into the VM 14a to thereby cause the VM 14a to transition to the ready state, and loads a program for executing the character recognition process into the VM 14b to thereby cause the VM 14b to transition to the ready state. As a result, a function for executing the drawing difference computing process is assigned to the VM 14a, and the function for executing the character recognition process is assigned to the VM 14b. If the VMs 14a and 14b are to execute the same process, the VM control unit 20 loads the same program into the VMs 14a and 14b to thereby cause the VMs 14a and 14b to transition to the ready state.

When the VM control unit 20 receives a request for a process from Tenant A, the VM control unit 20 acquires, from the storage 22, settings information (parameters) related to the process and specific to Tenant A, and acquires, from the storage 22, a snapshot of a VM (the VM 14a or the VM 14d) to which a function for executing the requested process has been assigned. Then, by use of the settings information specific to Tenant A and the snapshot, the VM control unit 20 causes the VM to transition from the ready state to the active state. That is, the VM control unit 20 mounts settings information specific to Tenant A onto a VM in the ready state (the VM 14a or VM 14b), thus causing the VM to transition from the ready state to the active state. This causes the VM to activate and execute a process assigned to the VM.

The same applies to Tenant B. That is, the VM control unit 20 loads a program for executing a process available to Tenant B into the VMs 14c, 14d, and 14e, thus causing the VMs 14c, 14d, and 14e to transition from the stopped state to the ready state. As a result, a function for executing the process available to Tenant B is assigned to the VMs 14c, 14d, and 14e. Further, the VM control unit 20 creates respective snapshots of the VMs 14c, 14d, and 14e in the ready state. The respective snapshots of the VMs 14c, 14d, and 14e are stored into the storage 22 while being included in the snapshot management information 26.

When the VM control unit 20 receives a request for a process from Tenant B, the VM control unit 20 acquires, from the storage 22, settings information (parameters) related to the process and specific to Tenant B, and acquires, from the storage 22, a snapshot of a VM (the VM 14c, the VM 14d, or the VM 14e) to which a function for executing the requested process has been assigned. Then, by use of the settings information specific to Tenant B and the snapshot, the VM control unit 20 causes the VM to transition from the ready state to the active state. That is, the VM control unit 20 mounts settings information specific to Tenant B onto a VM that is in the ready state (the VM 14c, the VM 14d, or the VM 14e), thus causing the VM to transition from the ready state to the active state. This causes the VM to activate and execute a process assigned to the VM.

At this time, the VM 14f to which no tenant has been distributed is in its stopped state. When a tenant is distributed to the VM 14f, the VM control unit 20 assigns a function for executing a process available to the tenant to the VM 14f, causing the the VM 14f to transition from the stopped state to the ready state, and then creates a snapshot of the VM 14f in the ready state.

Figure 4:
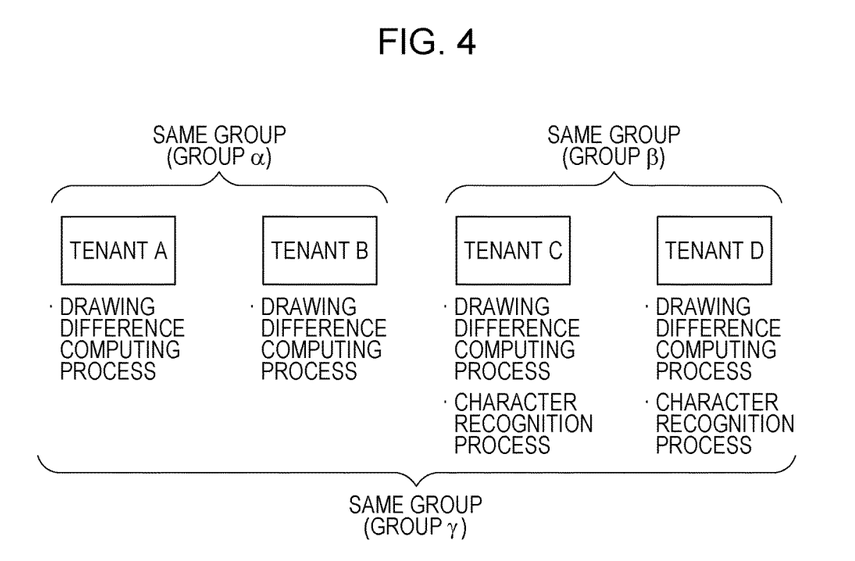
FIG. 4 illustrates processes available to individual tenants.

Referring to FIG. 4, the information processing system 10 will be described in detail by way of a specific example. FIG. 4 illustrates exemplary processes available to individual tenants.

For example, Tenants A and B (Users A and B) are able to use a drawing difference computing process as an example of an image processing job, and Tenants C and D (Users C and D) are able to use each of a drawing difference computing process and a character recognition process as an example of an image processing job. Processes available for use by each tenant (each user) are determined in advance in accordance with a service contract or other agreements, for example. Information indicating processes available to individual tenants is stored in the storage 22 in advance while being included in the tenant management information 28.

Settings information (parameters) specific to individual tenants is stored in the storage 22 in advance while being included in the parameter management information 30. For example, as settings information (parameters) related to a drawing difference computing process, settings information specific to Tenant A (User A), settings information specific to Tenant B (User B), settings information specific to Tenant C (User C), and settings information specific to Tenant D (User D) are stored in the storage 22 in advance while being included in the parameter management information 30. Likewise, as settings information (parameters) related to a character recognition process, settings information specific to Tenant C, and settings information specific to Tenant D are stored in the storage 22 in advance while being included in the parameter management information 30.

For example, suppose that the user distribution unit 16 distributes Tenant A to the VM 14a, distributes Tenant B to the VM 14b, distributes Tenant C to the VMs 14c and 14d, and distributes Tenant D to the VMs 14e and 14f.

The VM control unit 20 causes the VMs 14a, 14b, 14c, 14d, 14e, and 14f to transition from the stopped state to the ready state, and creates snapshots of the respective VMs and stores the created snapshots into the storage 22. For example, the VM control unit 20 loads a program for executing a drawing difference computing process into the VMs 14a, 14b, 14c, and 14e, thus causing the VMs 14a, 14b, 14c, and 14e to transition from the stopped state to the ready state. The VM control unit 20 then creates the respective snapshots of the VMs 14a, 14b, 14c, and 14e and stores the created snapshots into the storage 22. That is, the VM control unit 20 assigns a function for executing the drawing difference computing process to the VMs 14a, 14b, 14c, and 14e to cause the VMs 14a, 14b, 14c, and 14e to transition from the stopped state to the ready state, and then creates the respective snapshots of the VMs 14a, 14b, 14c, and 14e and stores the created snapshots into the storage 22. Further, the VM control unit 20 loads a program for executing a character recognition process into the VMs 14d and 14f to cause the VMs 14d and 14f to transition from the stopped state to the ready state, and then creates the respective snapshots of the VMs 14d and 14f and stores the created snapshots into the storage 22. That is, the VM control unit 20 assigns a function for executing a character recognition process to the VMs 14d and 14f to cause the VMs 14d and 14f to transition from the stopped state to the ready state, and then creates the respective snapshots of the VMs 14d and 14f and stores the created snapshots into the storage 22.

When the VM control unit 20 receives a request for a drawing difference computing process from Tenant A, the VM control unit 20 acquires, from the storage 22, settings information related to a drawing difference computing process and specific to Tenant A, and acquires, from the storage 22, a snapshot of the VM 14a to which Tenant A has been distributed. Then, by use of the settings information and the snapshot, the VM control unit 20 causes the VM 14a to transition from the ready state to the active state. That is, the VM control unit 20 mounts settings information specific to Tenant A onto the VM 14a that is in the ready state, thus activating the VM 14a. The VM 14a then executes the drawing difference computing process by use of the settings information specific to Tenant A. When the execution of the drawing difference computing process is complete, the VM control unit 20 causes the VM 14a to transition from the active state to the ready state. This configuration ensures that upon receiving a request for the next drawing difference computing process from Tenant A, the VM 14a starts executing the next process more quickly than in cases where the VM 14a is made to transition to the active state from the stopped state.

When the VM control unit 20 receives a request for a drawing difference computing process from Tenant B, the VM control unit 20 acquires settings information related to a drawing difference computing process and specific to Tenant B, and acquires, from the storage 22, a snapshot of the VM 14b to which Tenant B has been distributed. Then, by use of the settings information and the snapshot, the VM control unit 20 causes the VM 14b to transition from the ready state to the active state. That is, the VM control unit 20 mounts settings information specific to Tenant B onto the VM 14b that is in the ready state, thus activating the VM 14b. The VM 14b then executes the drawing difference computing process by use of the settings information specific to Tenant B. When the execution of the drawing difference computing process is complete, the VM control unit 20 causes the VM 14b to transition from the active state to the ready state. This configuration ensures that upon receiving a request for the next drawing difference computing process from Tenant B, the VM 14b starts executing the next process more quickly than in cases where the VM 14b is made to transition to the active state from the stopped state.

When the VM control unit 20 receives a request for a drawing difference computing process from Tenant C, the VM control unit 20 acquires settings information related to a drawing difference computing process and specific to Tenant C, and acquires, from the storage 22, a snapshot of the VM 14c to which Tenant C has been distributed. Then, by use of the settings information and the snapshot, the VM control unit 20 causes the VM 14c to transition from the ready state to the active state. That is, the VM control unit 20 mounts settings information specific to Tenant C onto the VM 14c that is in the ready state, thus activating the VM 14c. The VM 14c then executes the drawing difference computing process by use of the settings information specific to Tenant C. When the execution of the drawing difference computing process is complete, the VM control unit 20 causes the VM 14c to transition from the active state to the ready state. This configuration ensures that upon receiving a request for the next drawing difference computing process from Tenant C, the VM 14c starts executing the next process more quickly than in cases where the VM 14c is made to transition to the active state from the stopped state.

When the VM control unit 20 receives a request for a character recognition process from Tenant C, the VM control unit 20 acquires settings information related to a character recognition process and specific to Tenant C, and acquires, from the storage 22, a snapshot of the VM 14d to which Tenant C has been distributed. Then, by use of the settings information and the snapshot, the VM control unit 20 causes the VM 14d to transition from the ready state to the active state. That is, the VM control unit 20 mounts settings information specific to Tenant C onto the VM 14d that is in the ready state, thus activating the VM 14d. The VM 14d then executes the character recognition process by use of the settings information specific to Tenant C. When the execution of the character recognition process is complete, the VM control unit 20 causes the VM 14d to transition from the active state to the ready state. This configuration ensures that upon receiving a request for the next character recognition process from Tenant C, the VM 14d starts executing the next process more quickly than in cases where the VM 14d is made to transition to the active state from the stopped state.

When the VM control unit 20 receives a request for a drawing difference computing process from Tenant D, the VM control unit 20 acquires settings information related to a drawing difference computing process and specific to Tenant D, and acquires, from the storage 22, a snapshot of the VM 14e to which Tenant D has been distributed. Then, by use of the settings information and the snapshot, the VM control unit 20 causes the VM 14e to transition from the ready state to the active state. That is, the VM control unit 20 mounts settings information specific to Tenant D onto the VM 14e that is in the ready state, thus activating the VM 14e. The VM 14e then executes the drawing difference computing process by use of the settings information specific to Tenant D. When the execution of the drawing difference computing process is complete, the VM control unit 20 causes the VM 14e to transition from the active state to the ready state. This configuration ensures that upon receiving a request for the next drawing difference computing process from Tenant D, the VM 14e starts executing the next process more quickly than in cases where the VM 14e is made to transition to the active state from the stopped state.

When the VM control unit 20 receives a request for a character recognition process from Tenant D, the VM control unit 20 acquires settings information related to a character recognition process and specific to Tenant D, and acquires, from the storage 22, a snapshot of the VM 14f to which Tenant D has been distributed. Then, by use of the settings information and the snapshot, the VM control unit 20 causes the VM 14f to transition from the ready state to the active state. That is, the VM control unit 20 mounts settings information specific to Tenant D onto the VM 14f that is in the ready state, thus activating the VM 14f. The VM 14f then executes the character recognition process by use of the settings information specific to Tenant D. When the execution of the character recognition process is complete, the VM control unit 20 causes the VM 14*f* to transition from the active state to the ready state. This configuration ensures that upon receiving a request for the next character recognition process from Tenant D, the VM 14*f* starts executing the next process more quickly than in cases where the VM 14*f* is made to transition to the active state from the stopped state.

In some cases, charges are incurred based on the duration of time that a VM is in the active state. In such cases, if a VM that is not executing any process is maintained in the active state, this can result in increased usage cost even through no service is used. One way to avoid this would be to cause a VM that has completed the execution of a process to transition from the active state to the stopped state (scale-in). However, once a VM is stopped, activating the stopped VM takes time, with a corresponding delay in the start of execution of a process by the VM. According to the exemplary embodiment, a VM is made to transition to the ready state in advance. This reduces the time required to activate the VM, causing the VM to start executing a process more quickly.

Hereinafter, modifications of the exemplary embodiment will be described.

Modification 1

The VM control unit 20 may, in response to updating of a function (program) assigned to a VM, cause the VM to transition from the ready state to the stopped state, and delete a snapshot for the VM from the storage 22. When a function (program) is updated for a VM that is in the ready state, the ready state of the VM does not reflect the updated function, nor does a snapshot of the VM reflect the updated function. Thus, the VM control unit 20 causes the VM to transition to the stopped state. This resets the VM. The VM control unit 20 may load the updated function (the updated program) into the VM that is put in the stopped state, and then cause the VM to transition from the stopped state to the ready state. The updating of the function is thus reflected on the VM.

Modification 2

The VM control unit 20 may cause a predetermined upper limit number of VMs to transition to the ready state in advance, and for those VMs exceeding the upper limit number, the VM control unit 20 may maintain such VMs in their stopped state without causing the VMs to transition to the ready state in advance. For example, the upper limit number may be any number set by, for example, the administrator, may be a number determined based on the number of tenants (number of users) using the corresponding service (e.g., a number equal to the number of tenants, or a number either greater than or less than the number of tenants), or may be a number determined based on the sum total of the degrees of multiplicity for individual tenants (e.g., a number equal to the sum total, or a number either greater than or less than the sum total).

When the VM control unit 20 receives a request for a process from a tenant, the VM control unit 20 uses a VM that is in the ready state in preference to a VM that is in the stopped state. That is, in response to a request for a process from a tenant, the VM control unit 20 activates a VM that is in the ready state and causes the activated VM to execute the process, and if all the VMs in the ready state are executing a process, the VM control unit 20 activates a VM that is in the stopped state and causes the activated VM to execute the process. For example, for cases where charges are incurred based on the number of VMs that are in the ready state, setting an upper limit on the number of VMs that are in the ready state reduces usage cost in comparison to making all VMs transition to the ready state in advance. If all VMs are made to transition to the ready state in advance, this can result in some VMs being maintained in the ready state even through such VMs are not used. In this case, such VMs, even though not used, still incur usage cost. Such cost is reduced by setting an upper limit on the number of VMs that are in the ready state.

The VM control unit 20 causes a VM that has completed the execution of a process to transition from the active state to the ready state. If an upper limit number of VMs have already been made to transition to the ready state, the VM control unit 20 causes a VM that has newly completed the execution of a process to transition from the active state to the stopped state (scale-in).

For example, if a number equal to the sum total of the degrees of multiplicity for individual tenants is used as an upper limit number, and such an upper limit number of VMs are made to transition to the ready state in advance, then all processes requested by individual tenants are assigned to the VMs that are in the ready state. This means that for all of these processes, their execution starts more quickly.

Alternatively, a number equal to the number of tenants may be used as an upper limit number, with one VM in the ready state assigned to each tenant. This configuration ensures that at least one VM in the ready state is available for use by each tenant.

The VM control unit 20 may cause all VMs included in the VM group 14 to transition from the stopped state to the ready state in advance.

Modification 3

The VM control unit 20 may classify multiple tenants (multiple users) who use a common process into the same group, and assign one or more VMs to each same group. In this case, the VM control unit 20 loads a program for executing the common process into the VM in each group to assign a function (program) for executing the common process to the VM, thus causing the VM to transition from the stopped state to the ready state in advance.

Modification 3 will be described in detail below with reference to FIG. 4. For example, Tenants A and B both use a drawing difference computing process. This means that Tenants A and B use a common process (drawing difference computing process), and a completely identical process is used between Tenants A and B. In this case, the VM control unit 20 classifies Tenants A and B into the same group α in advance and, for example, assigns an upper limit number of VMs to the group α. The upper limit number may be, for example, a number determined based on the number of types of common processes (e.g., a number equal to or greater than the number of types of common processes), a number determined based on the number of tenants included in the same group (e.g., a number equal to the number of tenants, or a number either greater than or less than the number of tenants), or a number determined based on the sum total of the degrees of multiplicity for individual tenants (e.g., a number equal to the sum total, or a number either greater than or less than the sum total).

For example, suppose that a number equal to or greater than the number of types of common processes is used as an upper limit number. Since a drawing difference computing process is the common process for the group α, the number of types of common processes is one. Accordingly, the VM control unit 20 assigns one or more VMs to the group α. The VM control unit 20 loads a program for executing the common process (drawing difference computing process) to the one or more VMs assigned to the group α to assign a function (program) for executing the common process (drawing difference computing process) to the one or more VMs. Further, the VM control unit 20 creates a snapshot of each VM that is in the ready state and stores the created snapshot into the storage 22. Since a number of VMs equal to or greater than the number of types of common processes are assigned to the group α, a function for executing each common process is assigned to at least one VM.

The same applies to cases where the upper limit number is determined based on the number of tenants or the sum total of the degrees of multiplicity. In one example, a number equal to or greater than the number of tenants may be used as the upper limit number, with at least one VM in the ready state assigned to each tenant. This configuration ensures that at least one VM in the ready state is available for use by each tenant. In another example, a number equal to or greater than the sum total of the degrees of multiplicity for individual tenants may be used as the upper limit number. In this case, all processes requested by individual tenants are assigned to the corresponding VMs that are in the ready state.

When the VM control unit 20 receives a request for a drawing difference computing process from Tenant A, for example, the VM control unit 20 acquires, from the storage 22, settings information related to a drawing difference computing process and specific to Tenant A, and acquires, from the storage 22, a snapshot of a VM that has been assigned to the group α and to which a function for executing the drawing difference computing process has been assigned. Then, by use of the settings information and the snapshot, the VM control unit 20 causes the VM to transition from the ready state to the active state. The VM then executes the drawing difference computing process by use of the settings information specific to Tenant A. The same applies to when the VM control unit 20 receives a request for a drawing difference computing process from Tenant B.

If, with one VM assigned to the group α, a request for a drawing difference computing process is received from Tenant B while a drawing difference computing process requested by Tenant A is executed, the drawing difference computing process requested by Tenant B is executed after the execution of the drawing difference computing process requested by Tenant A is completed. When the execution of the drawing difference computing process requested by Tenant A is completed, the VM control unit 20 causes a VM that has completed the execution of the process to transition from the active state to the ready state, and mounts settings information specific to Tenant B onto the VM that is put in the ready state, thus causing the VM to transition from the ready state to the active state. The VM then executes the drawing difference computing process requested by Tenant B.

If, with multiple VMs assigned to the group α, a request for a drawing difference computing process is received from Tenant B while a drawing difference computing process requested by Tenant A is executed, the drawing difference computing process requested by Tenant B is executed by a VM different from the VM that is executing the drawing difference computing process requested by Tenant A. Thus, the drawing difference computing process requested by Tenant A and the drawing difference computing process requested by Tenant B are executed in parallel.

Tenants C and D both use a drawing difference computing process and a character recognition process. Thus, Tenants C and D use common processes (a drawing difference computing process and a character recognition process), and a completely identical set of processes is used between Tenants C and D. In this case, the VM control unit 20 classifies Tenants C and D into the same group β in advance and, for example, assigns an upper limit number of VMs to the group β.

For example, suppose that a number equal to or greater than the number of types of common processes is used as an upper limit number. Since a drawing difference computing process and a character recognition process are the common processes for the group β, the number of types of common processes is two. Accordingly, the VM control unit 20 assigns two or more VMs to the group β. Specifically, the VM control unit 20 assigns a function (program) for executing a common process (drawing difference computing process) to one or more VMs assigned to the group β, causing the one or more VMs to transition from the stopped state to the ready state in advance. Likewise, the VM control unit 20 assigns a function (program) for executing a common process (character recognition process) to one or more VMs assigned to the group β, causing the one or more VMs to transition from the stopped state to the ready state in advance. Further, the VM control unit 20 creates a snapshot of each VM that is in the ready state and stores the created snapshot into the storage 22. The same applies to cases where the upper limit number is determined based on the number of tenants or the sum total of the degrees of multiplicity.

When the VM control unit 20 receives a request for a character recognition process from Tenant C, for example, the VM control unit 20 acquires, from the storage 22, settings information related to a character recognition process and specific to Tenant C, and acquires, from the storage 22, a snapshot of a VM that has been assigned to the group β and to which a function for executing the character recognition process has been assigned. Then, by use of the settings information and the snapshot, the VM control unit 20 causes the VM to transition from the ready state to the active state. The VM then executes the character recognition process by use of the settings information specific to Tenant C. The same applies to cases such as when a request for a drawing difference computing process is received from Tenant C or when a request for a drawing difference computing process is received from Tenant D.

A VM assigned to neither the group α nor the group β is maintained in the stopped state. To make the VM execute a process, the VM control unit 20 needs to activate the VM and assign the process to the activated VM.

Modification 4

The VM control unit 20 may, if a partially identical (common) process is used between multiple tenants, classify the multiple tenants to the same group, and assign one or more VMs to each same group. In this case, the VM control unit 20 assigns, to each VM in each group, a function (program) for executing the partially identical (common) process, thus causing the VM to transition from the stopped state to the ready state in advance.

Modification 4 will be described in detail below with reference to FIG. 4. For example, since Tenants A and B both use a drawing difference computing process, and Tenants C and D both use a drawing difference computing process and a character recognition process, Tenants A, B, C, and D all use a drawing difference computing process. That is, a partially identical (common) process is used between Tenants A, B, C, and D. In this case, the VM control unit 20 classifies Tenants A, B, C, and D into the same group γ in advance and, for example, assigns an upper limit number of VMs to the group γ. As in Modification 3, the upper limit number may be, for example, a number determined based on the number of types of common processes, a number determined based on the number of tenants included in the same group, or a number determined based on the sum total of the degrees of multiplicity for individual tenants.

For example, suppose that a number equal to or greater than the number of types of common processes is used as an upper limit number. Since a drawing difference computing process is the common process for the group γ, the number of types of common processes is one. Accordingly, the VM control unit 20 assigns one or more VMs to the group γ. The VM control unit 20 loads a program for executing the common process (drawing difference computing process) to the one or more VMs assigned to the group γ to thereby assign a function (program) for executing the common process (drawing difference computing process) to the one or more VMs, causing the one or more VMs to transition from the stopped state to the ready state in advance. Further, the VM control unit 20 creates a snapshot of each VM that is in the ready state and stores the created snapshot into the storage 22.

When the VM control unit 20 receives a request for a drawing difference computing process from Tenant A, for example, the VM control unit 20 acquires, from the storage 22, settings information related to a drawing difference computing process and specific to Tenant A, and acquires, from the storage 22, a snapshot of a VM that has been assigned to the group γ and to which a function for executing the drawing difference computing process has been assigned. Then, by use of the settings information and the snapshot, the VM control unit 20 causes the VM to transition from the ready state to the active state. The VM then executes the drawing difference computing process by use of the settings information specific to Tenant A. The same applies to when a request for a drawing difference computing process is received from Tenant B, C, or D. As in Modification 3, processes requested by individual tenants may be executed in a sequential order, or multiple processes may be executed in parallel.

As in Modification 3, a VM not assigned to the group γ is maintained in its ready state. To make the VM execute a process, the VM control unit 20 needs to activate the VM and assign the process to the activated VM.

When the VM control unit 20 receives a request for a character recognition process from Tenant C or Tenant D, the VM control unit 20 activates a VM not assigned to the group γ, and assigns the character recognition process to the activated VM. Since Tenants C and D are able to use the common character recognition process, Tenants C and D may be assigned to the group β as in Modification 3 in addition to the group γ. In this case, the VM control unit 20 assigns a VM to the group β, and causes the VM to transition from the stopped state to the ready state. When the VM control unit 20 receives a request for a character recognition process from Tenant C or Tenant D, the VM control unit 20 activates the VM in the ready state that has been assigned to the group β, and causes the activated VM to execute the character recognition process.

For each of Modifications 3 and 4, when the VM control unit 20 activates a VM in the ready state that has been assigned to a group and causes the VM to execute a process, the VM control unit 20 may add a VM that is in the stopped state to the group. That is, the VM control unit 20 may assign a VM that is in the stopped state to the group, and load a program for executing a common process for the group into the VM to thereby assign a function (program) for executing the common process to the VM that is in the stopped state, thus causing the VM to transition from the stopped state to the active state. Thus, the number of VMs in the ready state assigned to the same group is maintained constant. The VM control unit 20 causes a VM that has completed the execution of a process to transition from the active state to the ready state. At this time, to ensure that the number of VMs in the ready state assigned to the same group is maintained constant, the VM control unit 20 may cause a VM in the ready state that has become redundant to transition to the stopped state (scale-in). Of course, even when such a group includes a VM in the ready state that has become redundant, the VM control unit 20 may maintain the VM that has become redundant in its ready state.

Modification 5

The VM control unit 20 may cause at least one VM in the VM group 14 to transition from the stopped state to the ready state, and the user distribution unit 16 may assign a process request from a high priority tenant to the VM in the ready state in preference to a process request from a lower priority tenant. In one example, the user distribution unit 16 may assign a process request from a high priority tenant to a VM that is in the ready state, and assign a process request from a low priority tenant to a VM that is in the stopped state. More specifically, the user distribution unit 16 may assign a process request from a tenant having a priority equal to or higher than a predetermined priority level to a VM that is in the ready state, and assign a process request from a tenant having a priority lower than the predetermined priority level to a VM that is in the stopped state. In another example, the user distribution unit 16 may sequentially assign process requests from higher priority tenants to VMs that are in the ready state until processing requests are assigned to all VMs that are in the ready state, and once process requests are assigned to all VMs that are in the ready state, the user distribution unit 16 may then assign process requests from lower priority tenants to VMs that are in the stopped state.

For example, the priority of each tenant may be determined based on the degree of multiplicity (the number of available processes) for each tenant, or may be determined based on the amount paid by each tenant for services provided by the information processing system 10. For example, the higher the degree of multiplicity for a tenant (the greater the number of processes available to a tenant), the higher the priority of the tenant. As described above, the degree of multiplicity is determined in accordance with a service contract or other agreements. Further, a higher priority may be given to a tenant who pays a higher amount.

Modification 5 may be applied to each of Modifications 3 and 4. This will be described below with reference to the group α illustrated in FIG. 4 by way of example. It is assumed that the degree of multiplicity for Tenant A is "100", and the degree of multiplicity for Tenant B is "1". In this case, Tenant A has a higher priority than Tenant B. Thus, the VM control unit 20 assigns a process request from Tenant A to a VM that is in the ready state in preference to a process request from Tenant B.

Modification 6

The VM control unit 20 may assign, in preference to a function for executing a low load process, a function for executing a high load process to a VM in advance to cause the VM to transition from the stopped state to the ready state in advance. For example, the VM control unit 20 may assign a function for executing a high load process to a VM in advance to cause the VM to transition from the stopped state to the ready state in advance, and may not assign a function for executing a low load process to a VM in advance. Of course, for cases where a function for executing a high load process is assigned to a VM in advance, if there is a VM with no function assigned in advance, the VM control unit 20 may assign a function for executing a low load process to the VM. As in the above-mentioned exemplary embodiment, the VM control unit 20 creates a snapshot of the VM in the ready state and stores the created snapshot into the storage 22.

An example of a high load process is image processing, and an example of a low load process is a user login process.

When the VM control unit 20 receives a request for a high load process from a tenant, the VM control unit 20 uses a snapshot of a VM in the ready state to which a function for executing the process has been assigned, and settings information specific to the tenant to cause the VM to transition from the ready state to the active state, and makes the VM execute the high load process. When the VM control unit 20 receives a request for a low load process from a tenant, the VM control unit 20 assigns a function for executing the function to a VM that is in the stopped state, and applies settings information specific to the tenant to the VM, thus causing the VM to transition from the stopped state to the active state. The VM control unit 20 then makes the VM execute the low load process.

Normally, the higher the load of a process, the longer the time required to load a program for executing the process. Thus, if a VM that executes the process is activated from its stopped state, longer time is required to activate the VM. For example, the time required to load a program for executing image processing is longer than the time required to load a program for executing a user login process. Thus, the time required to activate a VM that executes image processing is longer than the time required to activate a VM that executes a user login process. According to Modification 6, a program for executing a high load process is loaded and assigned to a VM in advance, and the VM is made to transition from the stopped state to the ready state in advance. This causes the execution of a high load process to start more quickly than in cases where the activation of a VM is started after a request for a high load process is received.

There are situations where it is not possible to cause all VMs to transition from the stopped state to the ready state in advance, such as when a limit is placed on the number of VMs that are in the ready state, or situations where it is not possible to assign all functions to VMs in advance, such as when the number of VMs is less than the number of processes to be used. According to Modification 6, in such causes, a function for executing a high load process is assigned to a VM in advance in preference to a function for executing a low load process, and the VM is thus caused to transition from the stopped state to the ready state in advance. This may improve the overall processing efficiency of the information processing system 10 in comparison to cases such as when a function is assigned to a VM irrespective of the magnitude of load or when a function for executing a low load process is assigned to a VM in preference to a function for executing a high load process. That is, the time required to cause a VM that is assigned a function for executing a high load process to transition from the stopped state to the ready state is longer than the time required to cause a VM that is assigned a function for executing a low load process to transition from the stopped state to the ready state. Modification 6 reduces this long time, which enhances the overall processing efficiency of the information processing system 10.

For the exemplary embodiment and Modifications 1 to 6 mentioned above, a hosting service may be employed, a cloud service may be employed, or both a hosting service and a cloud service may be employed. That is, VMs may be included in a hosting service, may be included in a cloud service, or may be included in both a hosting service and a cloud service.

In one example, the information processing system 10 mentioned above is implemented by cooperation of hardware and software. Specifically, the information processing system 10 includes one or more processors such as CPUs (not illustrated). As the one or more processors read and execute a program stored in a storage device (not illustrated), the functions of various component units of the information processing system 10 are implemented. The program is stored into the storage device via a recording medium such as a CD or DVD, or via a communication path such as a network. In another example, various component units of the information processing system 10 may be implemented by, for example, hardware resources such as processors, electronic circuits, or application specific integrated circuits (ASICs). A device such as a memory may be used for the implementation. In still another example, various component units of the information processing system 10 may be implemented by devices such as digital signal processors (DSPs) or field programmable gate arrays (FPGAs).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a controller that controls activation of a processing unit that processes data; and
a memory that stores information related to a condition of the processing unit,
wherein the controller causes the processing unit to transition in advance from a stopped state to a ready state that is an intermediate state between the stopped state and an active state, and causes the memory to store information related to the condition of the processing unit in the ready state, and in response to receipt of a process request from a user, the controller causes the processing unit in the ready state to transition from the ready state to the active state by use of settings information specific to the user and the information related to the condition of the processing unit in the ready state,
wherein the controller assigns a function for executing a process to the processing unit in advance to cause the processing unit to transition from the stopped state to the ready state in advance, and in response to receipt of a process request from a user, the controller mounts settings information specific to the user onto the processing unit in the ready state to cause the processing unit to transition from the ready state to the active state,
wherein the controller controls activation of a plurality of processing units, and
wherein the controller assigns, in preference to a function for executing a first process, a function for executing a second process to a processing unit, of the plurality of processing units, in advance to cause the processing unit to transition from the stopped state to the ready state in advance, the second process requiring a greater processing load than the first process.

2. The information processing apparatus according to claim 1,
wherein in response to updating of a function assigned to the processing unit in the ready state, the controller causes the processing unit to transition from the ready state to the stopped state.

3. The information processing apparatus according to claim 1,
wherein the controller classifies a plurality of users who use a common process into a same group, assigns a processing unit to each same group, and assigns a function for executing the common process to the processing unit in each group to cause the processing unit to transition from the stopped state to the ready state.

4. The information processing apparatus according to claim 3,
wherein if a completely identical process is used between a plurality of users, the controller classifies the plurality of users to a same group.

5. The information processing apparatus according to claim 3,
wherein if a partially identical process is used between a plurality of users, the controller classifies the plurality of users into a same group, assigns a processing unit for executing the partially identical process to the same group, and assigns a function for executing the partially identical process to the processing unit to cause the processing unit to transition from the stopped state to the ready state.

6. The information processing apparatus according to claim 1,
wherein the controller causes at least one processing unit of the plurality of processing units to transition from the stopped state to the ready state, and assigns a process request from a first user to the at least one processing unit in the ready state in preference to a process request from a second user, the first user having a higher priority than the second user having a lower priority.

7. The information processing apparatus according to claim 6,
wherein the controller assigns a process request from the first user having the higher priority to a processing unit that is in the ready state, and assigns a process request from the second user having the lower priority to a processing unit that is in the stopped state.

8. The information processing apparatus according to claim 6,
wherein a user with a greater number of processes available to the user is given a higher priority.

9. The information processing apparatus according to claim 1,
wherein the second process comprises image processing, and the first process comprises a user login process.

10. The information processing apparatus according to claim 1,
wherein the controller causes a processing unit that has completed execution of a requested process to transition from the active state to the ready state.

11. The information processing apparatus according to claim 10,
wherein if a predetermined upper limit number of processing units have already been caused to transition to the ready state, the controller causes a processing unit that has newly completed execution of a process to transition from the active state to the stopped state.

12. A non-transitory computer readable medium storing a program causing a computer to execute a process for processing information, the process comprising:
controlling activation of a processing unit that processes data; and
storing, in a memory, information related to a condition of the processing unit;
causing the processing unit to transition from a stopped state to a ready state in advance, the ready state being an intermediate state between the stopped state and an active state;
storing, into the memory, information related to the condition of the processing unit in the ready state;
in response to receipt of a process request from a user, causing the processing unit in the ready state to transition from the ready state to the active state by use of settings information specific to the user and the information related to the condition of the processing unit in the ready state;
assigning a function for executing a process to the processing unit in advance to cause the processing unit to transition from the stopped state to the ready state in advance, and in response to receipt of a process request from a user, mounting settings information specific to the user onto the processing unit in the ready state to cause the processing unit to transition from the ready state to the active state;
controlling activation of a plurality of processing units; and
assigning, in preference to a function for executing a first process, a function for executing a second process to a processing unit, of the plurality of processing units, in advance to cause the processing unit to transition from the stopped state to the ready state in advance, the second process requiring a greater processing load than the first process.

* * * * *